(12) United States Patent
Herden et al.

(10) Patent No.: US 6,232,771 B1
(45) Date of Patent: May 15, 2001

(54) DEVICE FOR CONTACTLESS MEASUREMENT OF ANGLE OF ROTATION OF LINEAR MOTION BETWEEN ROTOR AND STATOR COMPOSED OF A PLURALITY OF PARTS

(75) Inventors: Werner Herden, Gerlingen; Asta Reichl; Klaus Marx, both of Stuttgart; Thomas Klotzbuecher, Rudersberg; Friedrich Bielert, Goettingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/180,361

(22) PCT Filed: Jun. 21, 1998

(86) PCT No.: PCT/DE97/01295

§ 371 Date: Nov. 6, 1998

§ 102(e) Date: Nov. 6, 1998

(87) PCT Pub. No.: WO98/08059

PCT Pub. Date: Feb. 26, 1998

(30) Foreign Application Priority Data

Aug. 24, 1996 (DE) .............................................. 196 34 281

(51) Int. Cl.$^7$ ............................... G01B 7/14; G01B 7/30; G01D 5/14

(52) U.S. Cl. ................................... 324/207.25; 324/207.2

(58) Field of Search ............................ 324/207.25, 207.2, 324/207.21, 207.24, 174; 338/32 H, 32 R

(56) References Cited

U.S. PATENT DOCUMENTS 5,889,400 * 3/1999 Nakazawa ....................... 324/207.25

FOREIGN PATENT DOCUMENTS

| 28 15 959 | 11/1978 | (DE) . |
|---|---|---|
| 24 49 697 | 11/1979 | (DE) . |
| 29 23 644 C2 | 12/1981 | (DE) . |
| 196 30 764 A1 | 4/1997 | (DE) . |
| 695 02 512 T2 | 1/1999 | (DE) . |
| 0 578 299 A1 | 1/1994 | (EP) . |
| 0 611 951 A2 | 8/1994 | (EP) . |
| 0 665 416 A1 | 8/1995 | (EP) . |
| 90 15 223 | 6/1992 | (FR) . |
| 2 746 912 | 10/1997 | (FR) . |
| 1-150812 | 6/1989 | (JP) . |
| WO 92/10722 | 6/1992 | (WO) . |
| WO 95/14911 | 6/1996 | (WO) . |
| 98/08059 | 2/1998 | (WO) . |

* cited by examiner

Primary Examiner—Walter E. Snow
(74) Attorney, Agent, or Firm—Michael J. Striker

(57) ABSTRACT

The measuring device for contactless determination of a rotation angle includes a rotatable permanent magnet (22) arranged in a stator (10) made of magnetically conductive material and including two stator segments (13,14) and a surrounding cup-shaped housing part (11). One stator segment (14) is mounted directly on the bottom (15) of the housing part (11) so that a magnetically conductive connection exists. A layer (18) of magnetically nonconductive material is present between the other stator segment (13) and the bottom (15) so that no magnetic flux is possible there. The rotatable permanent magnet (22) is arranged so that it is movable in an air gap between the two stator segments (13,14) and the housing part (11) with the direction of magnetic polarization oriented radially, i.e. toward the stator segments (13,14) or in the opposite direction. The measuring element (20) is arranged in the slot (12) between the two stator segments (13,14). Because of this structural design, it is possible to divide the magnetic flux so that a shift in the linear measurement range is possible so that no sign change occurs within the linear measurement range.

9 Claims, 13 Drawing Sheets

DEVICE FOR CONTACTLESS MEASUREMENT OF ANGLE OF ROTATION OF LINEAR MOTION BETWEEN ROTOR AND STATOR COMPOSED OF A PLURALITY OF PARTS

BACKGROUND OF THE INVENTION

1. Field of the Invention

The invention relates to a measuring device for contactless capture or determination of an angle of rotation or of a linear motion.

2. Prior Art

From French Patent Disclosure FR 90 15 223, a measuring device is known in which a stator and a rotor are moved relative to one another. Between the stator and the rotor, each of which comprises magnetically conductive material, there is a small air gap. In the rotor, a first annular permanent magnet which is radially polarized is disposed over a length of 180°. In the remaining region of the stator, also encompassing 180°, there is a second annular permanent magnet with opposite polarization. The stator also has two diametrically opposed air gaps. In at least one of these air gaps, there is a Hall sensor. In the rotary motion of the rotor relative to the stator, the intensity of the magnetic field passing through the Hall sensor varies. The linear measurement range of the measurement signal thus generated is limited, however, to a magnitude of approximately±75°. Moreover, this linear measurement range has a change of sign. It is possible to correct this in a complicated and expensive way in an ensuing electrical circuit.

It is also known, for measuring linear motions, to displace permanent magnets relative to a magnet-field-sensitive element. In this respect it is also known to carry the flux of the permanent magnet with the aid of magnetically conductive parts.

SUMMARY OF THE INVENTION

It is an object of the present invention to provide an improved measuring device for contactless determination of an angle of rotation or linear motion that does not suffer from the above-described disadvantage.

According to the invention a measuring device for contactless determination of a rotation angle of a rotor relative to a multi-part stator made from a magnetically conductive material comprises at least one magnet-field-sensitive element and at least one segment of at least one ring magnet arranged in the rotor;

wherein a first air gap is located between the stator and the rotor and at least one second air gap is formed in the stator; the at least one magnet-field-sensitive element is located in the at least one second air gap; the stator comprises stator parts; at least one of the stator parts has a magnetically conductive connection with remaining stator parts and at least one other of the parts has no magnetically conductive connection with remaining stator parts, so that the ring magnet has a magnetic flux split up so as to produce at least one first partial flux which flows through the at least one magnet-field-sensitive element.

The measuring device according to the invention for contactless capture of an angle of rotation or of a linear motion has the advantage over the prior art that a linear measurement range without a change of sign in the measurement voltage is possible. The linear measurement range is greater than 90° and in particular and above all greater than 110°. The linear measurement range free of a change of sign is possible in both directions of rotation of the measuring device, that is, in both the positive and the negative direction of rotation. Depending on how the magnet-field-sensitive element is embodied, a positive or negative output voltage is possible over the linear measurement range.

It is possible with simple engineering provisions to generate an asymmetrical course of the field lines and thus to make the linear measurement range free of a change of sign. This increases the measurement range. The actual measurement angle can be determined individually by the size of the segments.

BRIEF DESCRIPTION OF THE DRAWING

Exemplary embodiments of the invention are shown in the drawing and described in further detail in the ensuing description.

FIG. 2a is a longitudinal section through the exemplary embodiment of FIG. 1 at an angular position of the magnet and the associated course of magnet lines for a maximum output signal in the Hall element, while

FIG. 10 shows a modification with a magnetically conductive bridge in the stator; FIG. 10a shows the position of the rotor at a maximum magnetic flux through the Hall element and FIG. 10c shows the associated magnetic flux, which

DESCRIPTION OF THE EXEMPLARY EMBODIMENTS

Figure 1:
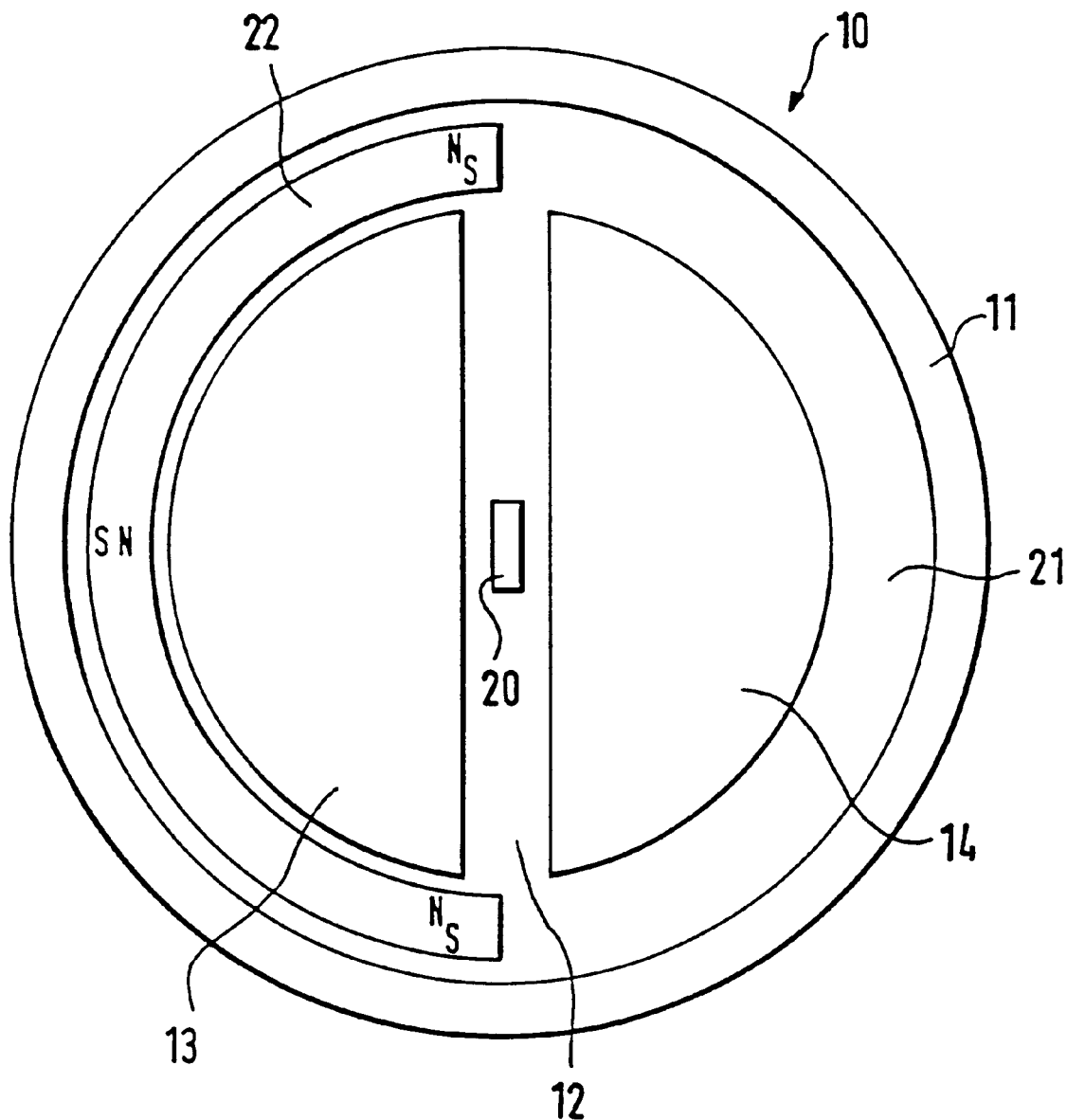
FIG. 1 shows a top view on a first exemplary embodiment.

In FIG. 1, reference numeral 10 designates a stator, which comprises a cup-shaped housing part 11. Two segments 13, 14 separated by a slot 12 are inserted into the housing part 11. Both segments 13, 14 rest on the bottom (FIG. 2a) of the housing part 11. Both the side wall 16 and the bottom 15 of the housing part 11 of the stator 10 comprise magnetically conductive and in particular soft-magnetic material. The segment 14 likewise comprises magnetically conductive and in particular soft-magnetic material. Conversely, the second segment 13 has a magnetically conductive upper layer 15 of soft-magnetic material and a layer 18 of non-magnetically conductive material, such as plastic. It is placed with the layer 18 on the bottom 15 of the housing part 11 of the stator 10, for example being glued there. A magnet-field-sensitive element 20, such as a field plate, magnet transistor, to resist element or Hall element, is inserted into the gap 12 between the two segments 13, 14. It is important here that the magnetic-field-sensitive component have the most linear possible dependency of its output signal on the magnetic induction B. A rotor 22 is disposed in the gap 21 between the housing part 11 and the two segments 13, 14 and is connected, by a connection not shown, to the component whose angle of rotation is to be determined. The rotor 22 comprises a magnet, in particular a ring magnet, whose direction of magnetic polarization is oriented toward the segments 13, 14. Thus the north pole of the ring magnet 22, for instance, points to the segments 13, 14. It is understood that there is a slight air gap between the segments 13, 14 and the ring magnet 22, or between the ring magnet and the edge 16 of the housing part 11, to allow the ring magnet 22 acting as a rotor to move. The depth of the ring magnet 22 is approximately equivalent to the depth of the magnetically conductive layer 17 of the segment 13. There is a layer 24 of magnetically nonconductive material between the side wall 16 and the bottom 16 of the housing part 11.

Figure 2A:
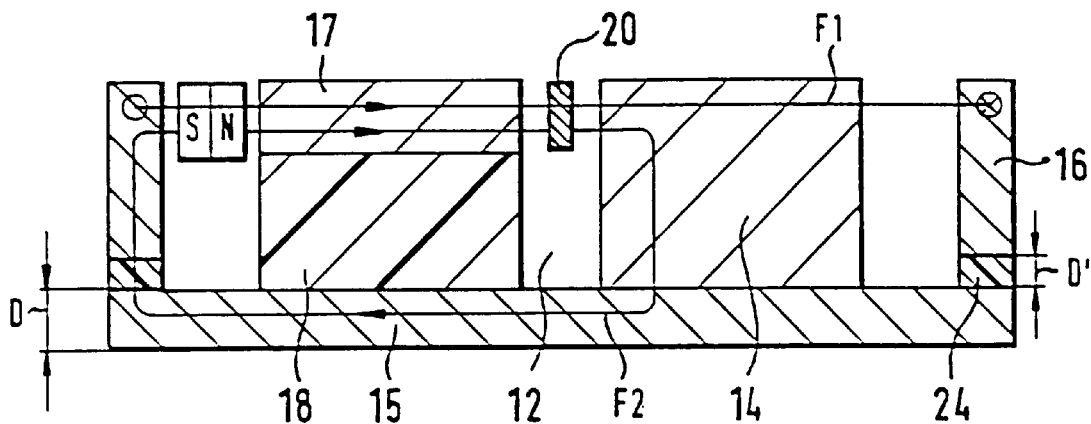
Figure 2B:
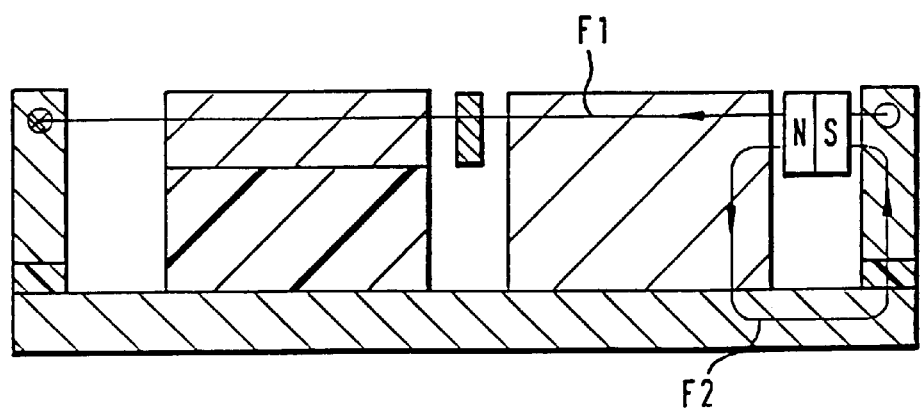
FIG. 2b shows the angular position of the magnet and the associated course of magnet lines for a minimal output signal in the Hall element.

Because of the structural design of the stator 10 and the association of the rotor 22, it is possible for the lines of magnetic flux of the ring magnet 22 acting as a rotor to be split up, and thus to shift the linear range of the signal curve. Shifting the signal curve is intended to prevent any change of sign over the entire linear measurement range. In FIG. 2a, the angular position of the rotor 22 relative to the stator 10 that generates a maximum output signal in the Hall element 20 is shown. The field lines emerging from the magnet 22, that is, from its north pole, pass through the air gap 21 here and flow through the layer 17 of the segment 13. Once the field lines have passed through the Hall element 20 and the slot 12, the magnetic flux splits into the partial fluxes F1 and F2. The magnetic partial flux F2 bends in the segment 14 and is returned to the permanent magnet 22, that is, to its south pole, via the bottom 15, the layer 24, the side wall 16, and the air gap 21. Conversely, the field lines of the magnetic partial flux 22 extend in a plane parallel to the bottom 15 of the housing part 11 and thus flow through the segment 14 and the air gap 21 and pass via the side wall 16 and the air gap 21 to return to the south pole of the permanent magnet 22. During the rotation of the rotor 22 relative to the stator 10, a linearly extending measurement signal is generated in the Hall element 20 because of the change in magnetic flux. After a 180° rotation, at the position shown in FIG. 2b, the minimum magnetic flux through the Hall element 20 and thus the minimal output signal occur. As can be seen from FIG. 2b, the course of the magnetic partial flux F1 is equivalent to that in FIGS. 2a, but in the opposite direction. The magnetic partial flux F2 no longer flows through the Hall element 20. Instead, on emerging from the permanent magnet 22 and passing through the air gap 21, the partial flux F2 is axially deflected in segment 14, and the magnetic partial flux F2 passes via the bottom 15, the nonmagnetic layer 24, and the side wall 16 and the air gap 26 back to the south pole of the permanent magnet 22. Because of this asymmetry of the total magnetic flux of the permanent magnet 22, that is, the splitting up of the magnetic flux of the permanent magnet 22 into the magnetic partial fluxes F1 and F2, there is a vertical shift in the characteristic curve of the measurement signal of the angle sensor. The degree or in other words magnitude of the vertical shift, or displacement, is dependent on the ratio of the partial fluxes F1 and F2. The magnitude of the partial flux F2 can be controlled via the thickness of the bottom 15 and/or via the thickness of the nonmagnetic gap 24 between the bottom 15 and the side wall 16. A maximum vertical displacement of the characteristic curve results if the nonmagnetic gap 24 is omitted. In all the positions between the extreme positions shown in FIGS. 2a and 2b, the magnetic fluxes split so as to produce the greatest possible linear characteristic curve of the angle sensor.

Figure 3A:
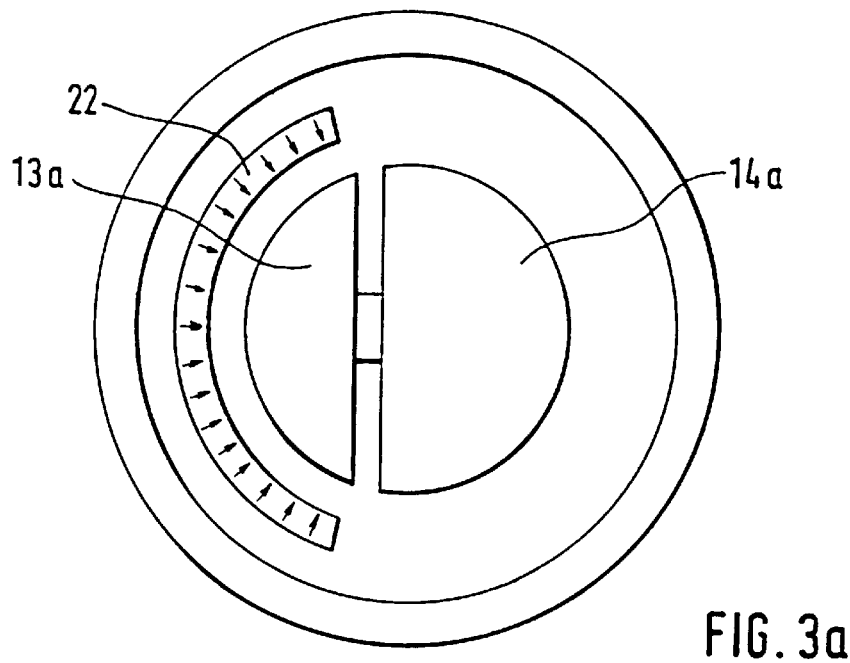
FIG. 3a shows a top view and FIG. 3b a longitudinal section through a second exemplary embodiment.
Figure 3B:
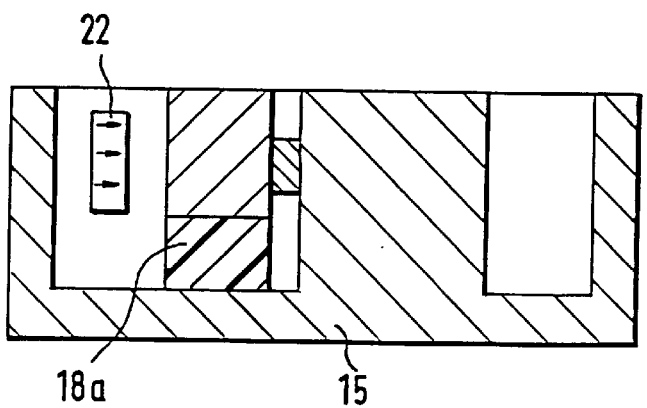

In the exemplary embodiment of FIGS. 1 and 2, the two segments 13 and 14 are the same size, so that the slot 12 extends centrally between the two segments 13, 14. In a distinction from this, in the exemplary embodiment of the angle sensor shown in FIG. 3a and FIG. 3b, the segments 13a and 14a are embodied asymmetrically. In FIGS. 3a and 3b, the larger (14a) of the two segments is again magnetically connected to the housing part 11 via the bottom plate 15. The smaller segment 13a is magnetically separated from the bottom plate 15, because of a nonmagnetically conductive part 18a. While in the exemplary embodiment of FIG. 1 an opening angle and hence an angle of the rotor 22 of 180° is contemplated, a smaller opening angle is possible in the exemplary embodiment of FIG. 3. It should be noted that the size of the permanent magnet 22 acting as a rotor must be adapted to the size of the segment 13a having the nonmagnetic part 18a.

Figure 4:
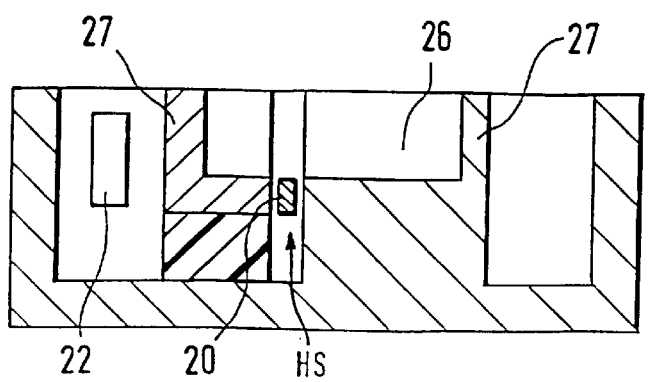
FIG. 4 shows a longitudinal section through a modification of the second exemplary embodiment.

By means of the structural embodiment, that is, the modification compared with the exemplary embodiment of FIG. 3, in the exemplary embodiment of FIG. 4 the magnetic induction B at the site of the Hall element 20 can be increased. To that end, a bore or recess 26 is made from above in both segments 13a, 14a. Because the walls 27 of the two segments 13a, 14a are now thin as a result, a concentrated magnetic flux through the Hall element 20 is attained. Because of this special structural modification over the exemplary embodiment of FIG. 3, the magnetic field lines of the permanent magnet 22 acting as a rotor are concentration at the site of the Hall element 20.

Figure 5:
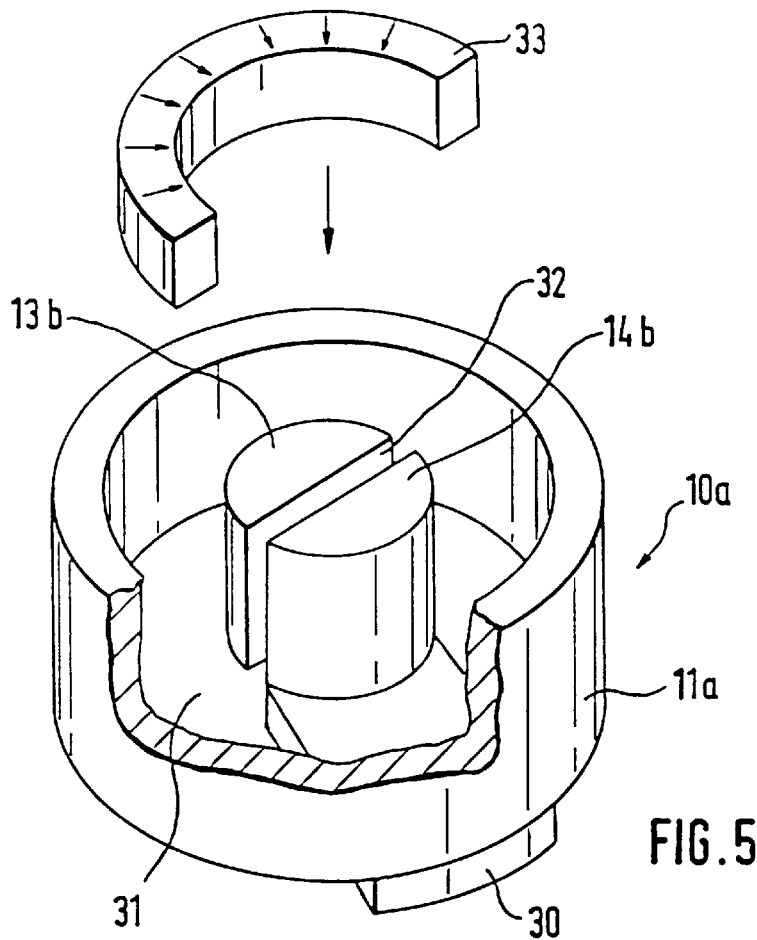
FIG. 5 is a perspective view of a further exemplary embodiment.

In FIG. 5, a further exemplary embodiment is shown. While in the exemplary embodiment of FIGS. 1–4 the two segments 13, 14 were seated on the bottom 15 of a cup-shaped housing part 11, in FIG. 5 the stator 10a has an annular or relatively short, tubular housing part 11a. The two segments 13b and 14b are again made of soft-magnetic material as part of the stator 10a. With regard to their size, both segments 18b and 14b are embodied symmetrically. Segment 14b entirely comprises magnetically conductive material, for instance soft-magnetic material, and has an extension 30 that protrudes as far as or underneath the face end of the housing part 11a. An important aspect here is that the part 30 makes a magnetically conductive connection between the segment 14b and the housing part 11a. The width and shape of the part 30 can vary greatly here. For instance, it can take the form of a strip, as shown in FIG. 5, or be embodied as a 180° semicircular segment. The other segment 13b is thus magnetically decoupled because of the air gap 32 between the two segments 13b and 14b and the air gap 31 between the housing part 11a; that is, there is no closed magnetically conductive connection. Although not shown in FIG. 5, a magnetic-field-sensitive sensor, in particular a Hall sensor is disposed in the gap 32 embodied between the two segments 13b and 14b, and this is also the case in all the previous exemplary embodiments as well. As the stator, a radially magnetized permanent magnet 33 is disposed in the air gap 31. The permanent magnet 33 is connected here to a component, not shown, whose angle of rotation is to be determined. The permanent magnet 33 rotates concentrically in the air gap 31 and comes into contact with neither the segments 13b and 14b nor the inner wall of the housing part 11a. The direction of magnetization of the permanent magnet 33 is indicated by arrows in FIG. 5 and points in the direction of the segments 13b and 14b. However, an opposite direction of magnetization is also possible.

Figure 6:
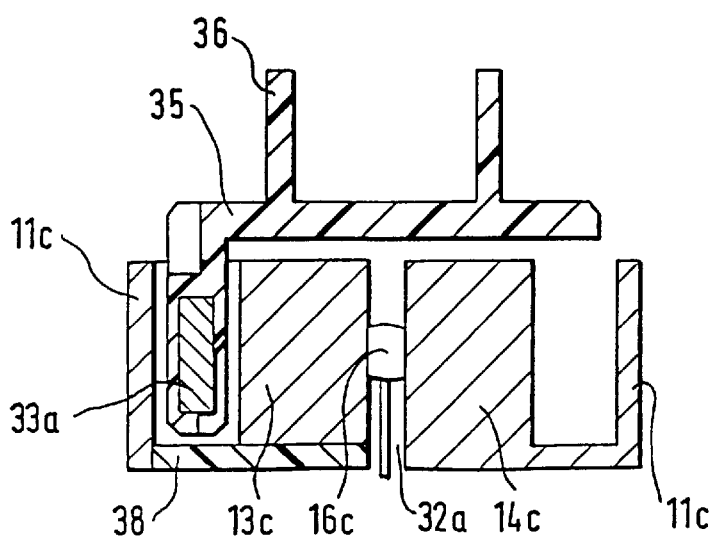
FIGS. 6, 7 and 8 each show a modification of FIG. 5.

FIG. 6 shows a modification of the exemplary embodiment of FIG. 5, and in particular the possibility of connecting the permanent magnet acting as a rotor to the component to be determined. Here the ring magnet 33a is surrounded by a connecting element 35, which for instance is of plastic. The connecting element 35 has a flangelike extension 36, with which it grips a shaft, for instance, whose rotary motion is to be determined. As in FIG. 5, the segment 14c is connected to the component 11c with the aid of a part. All three elements in FIG. 6 are made in one piece, however, so that a U-shaped cross section for the segment 14c results, with each of the legs having a different thickness. This one-piece component can be made from stacked transformer laminations or from sintered material. The other segment 13c is secured to the housing part 11c, for instance being glued to it, with the aid of an extension 38 of magnetically nonconductive material, such as a plastic plate. The Hall element 16c is disposed in the gap 32a between the two segments 13c and 14c.

Figure 7:
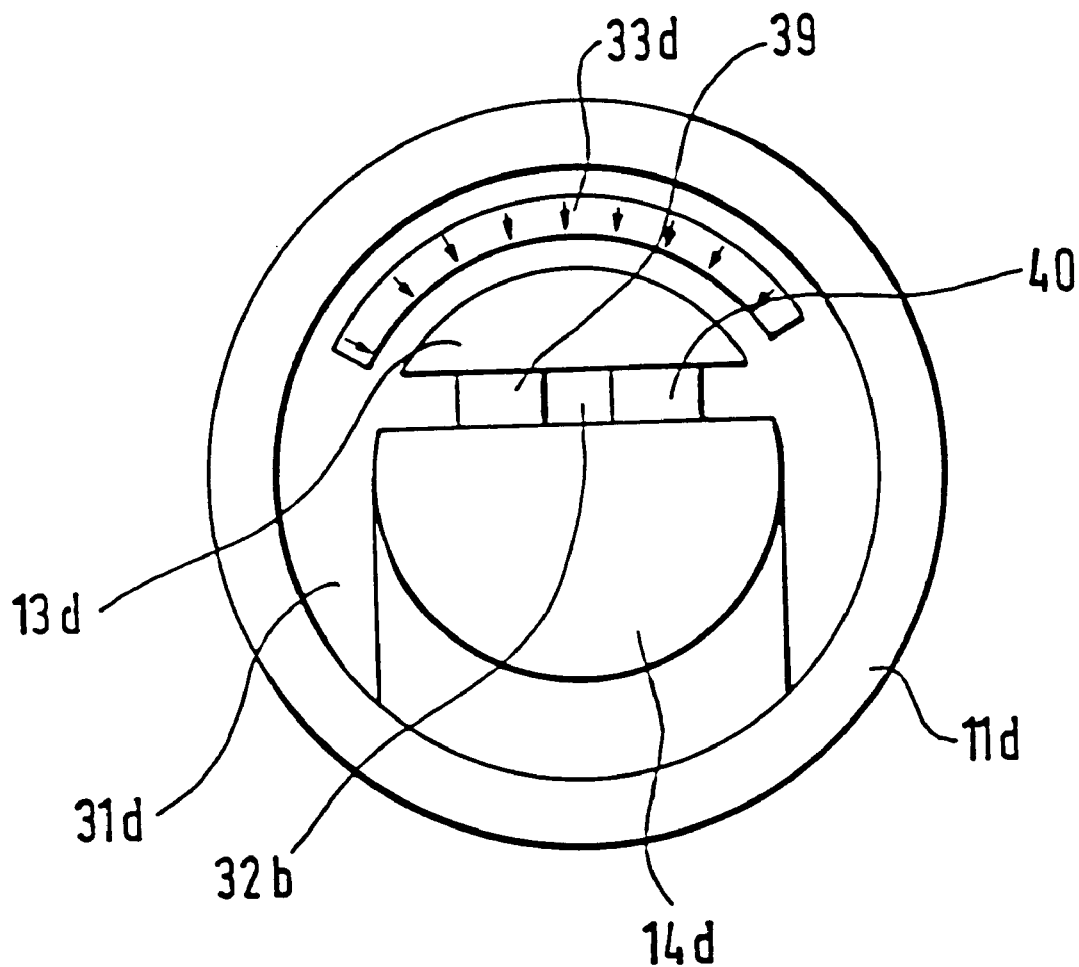

It is understood that the operating principle of this angle sensor, of the kind shown in FIGS. 5 and 6, is not limited to a symmetrical embodiment of the two segments 13b, 14b and 13c, 14c. Ring magnets with an opening angle differing from the opening angle α of 180° shown in FIG. 6 may also be used. In the modified exemplary embodiment in FIG. 7, two different-sized segments 13d and 14d are shown. The slot 32b between the two segments 13d and 14d thus no longer extends through the axis of the housing part 11d. In FIG. 7, the larger segment 14d is now connected to the housing part 11d via a lamination, not shown in FIG. 7 but of soft-magnetic material as in FIGS. 5 and 6. Conversely, the smaller segment 13d is connected nonmagnetically to the housing 11d, so that in other words a closed flow of magnetic flux is not possible. The permanent magnet 33d located in the annular gap 31d has an opening angle corresponding to the smaller segment 13d. In FIG. 7, this opening angle α is approximately 140°. As a further modification, two Hall sensors 39, 40 are disposed in the gap 32b. Naturally it is also possible for two Hall elements to be disposed in the exemplary embodiment of FIG. 5 and 6 in the gap 32 and 32a, respectively.

Figure 8:
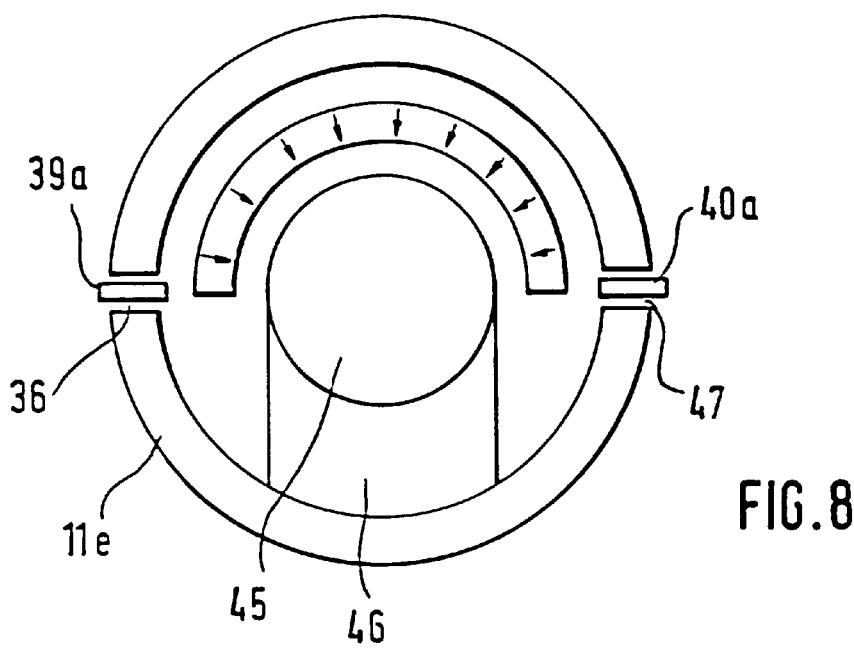

The exemplary embodiment of FIG. 8, instead of the two segments 13, 14, has a rodlike core 45 as its rotor. In the housing part 11e, there are two slots 46, 47, in each of which one Hall element 39a, 40a is disposed. This embodiment allows the core 45 to be produced in a simple way from solid material. But a slot or central bore in the core 45 would not affect the function of the sensor, either. The entire core 45 is connected to the housing part 11e with the aid of an extension 46 of magnetically conductive and in particular soft-magnetic material.

Figure 9A:
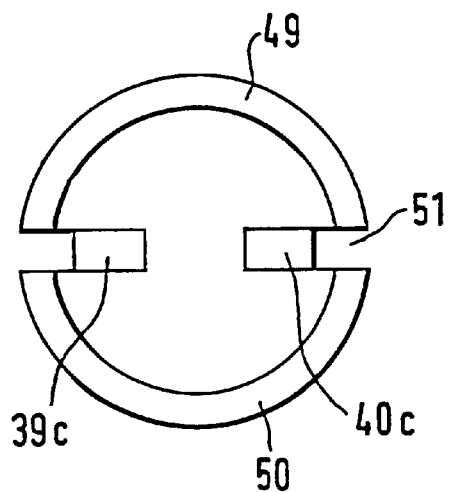
FIGS. 9a, 9b show a modification in the form of the stator to increase magnetic induction in the region of the Hall elements.
Figure 9B:
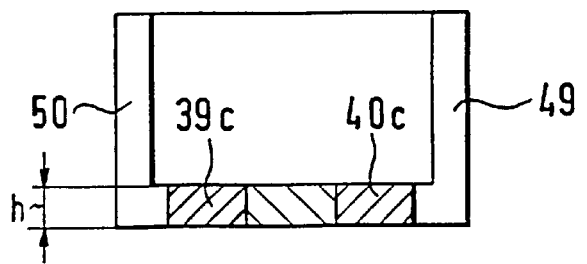

If the two Hall elements 39, 40, as in FIG. 7 or in FIG. 5, are disposed in the slot between the two segments 13, 14, then by means of special shaping of the two segments 13, 14 the maximum height of the magnetic induction at the site of the Hall elements can be improved. This special shaping can be employed both in the symmetrical version in FIG. 5 and in the asymmetrical version of FIG. 7. The two segments here take the form of a cup, divided by the slot 51, with the cup parts 49, 50. The Hall elements 39c and 40c are let into the bottom of the two cup parts 49, 50, as can be seen in FIG. 9b. The aforementioned increase in the maximum height of the magnetic induction is obtained if, with the external surface area of the two cup parts 49, 50 unchanged, the gap area 51 between them is reduced, that is, if the gap height h is as slight as possible. The magnetic field lines are then concentrated in the bottom of the two cup parts 49, 50, so that the magnetic induction B at the site of the Hall elements 39c, 40c rises.

Figure 10A:
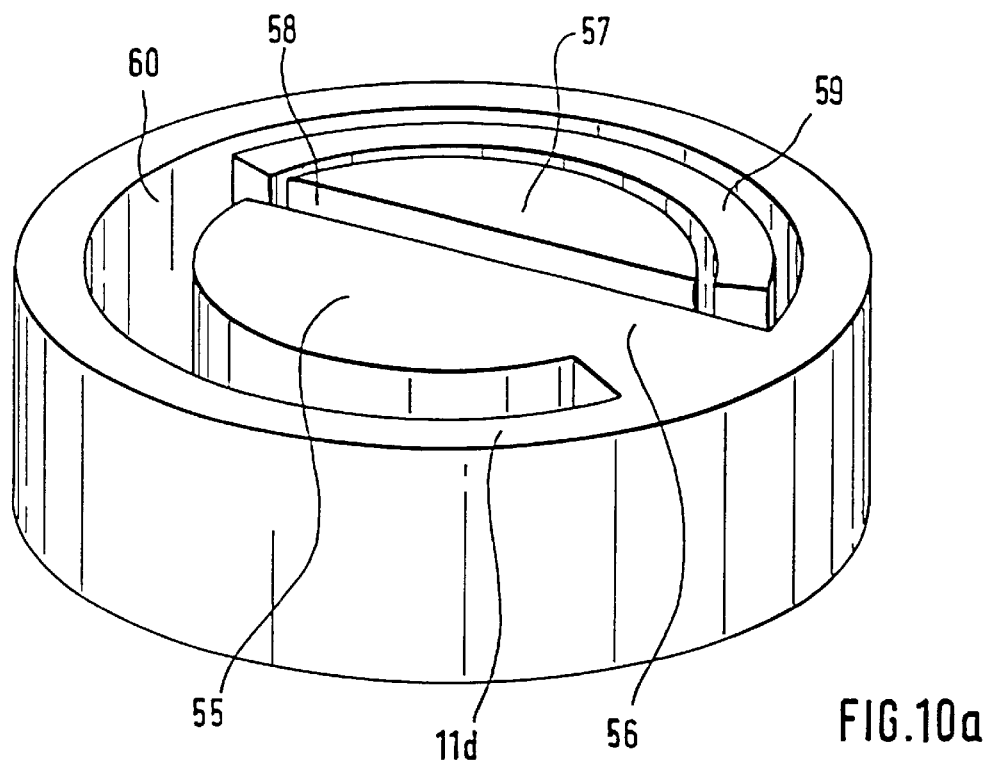
Figure 10B:
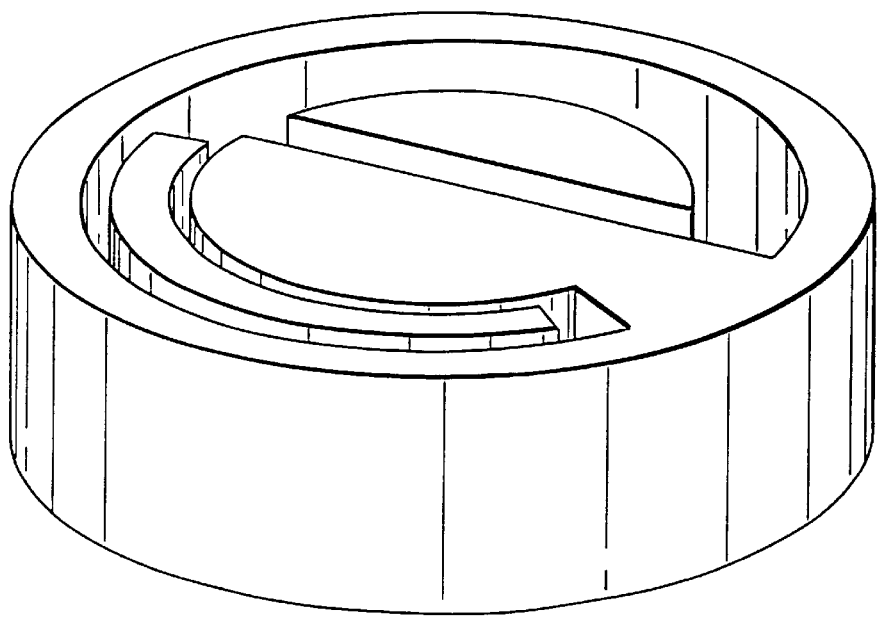
FIG. 10b shows the position of the rotor at minimal magnetic flux through the Hall element and FIG. 10d shows the associated magnetic flux.
Figure 10C:
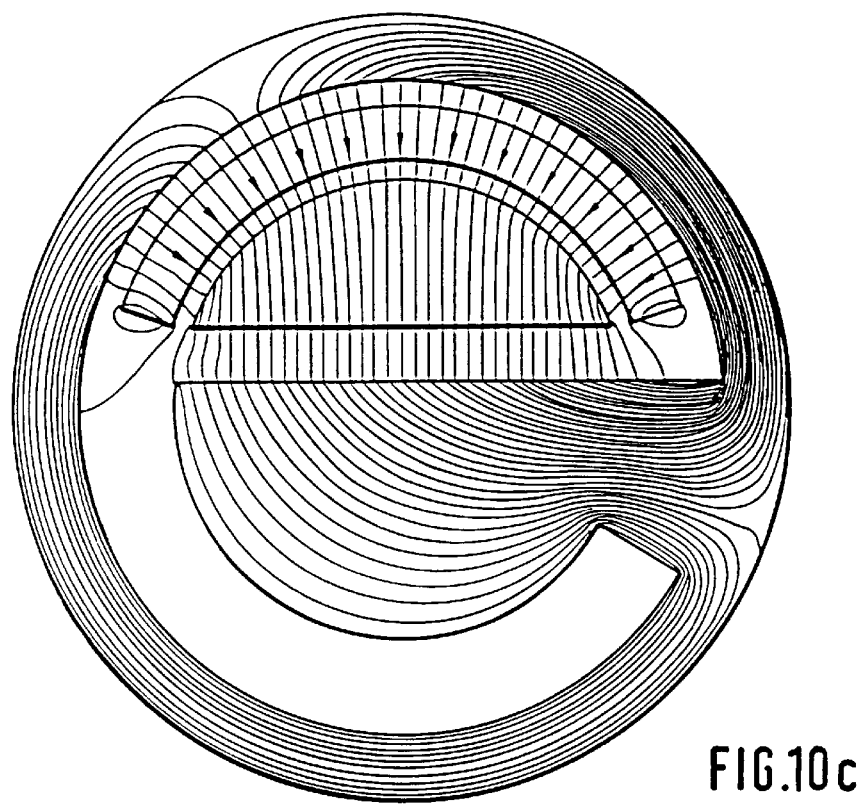

In FIGS. 10a–10d, a modification of the angle sensor is shown. Until now, one of the segments was joined to the bottom, that is, the face end of the outer housing part of the stator, with the aid of an extension. Now, instead, one of the segments 55 is joined to the outer housing part 11d with the aid of a bridge 56. The second segment element 57 again has no connection with the housing part 11d; that is, there is no magnetically conductive connection between the segment 57 and the housing part 11. Because of the bridge 56, the angular range to be determined is thus limited; that is, measurements beyond an angle of approximately 200° are not possible. Advantageously, however, in this embodiment the segment 55, the bridge 56 and the housing part 11d are made as a one-piece component of soft-magnetic material, such as stacked transformer laminations or sintered material. Naturally, once again it is possible here for the two segments 55, 57 to be embodied not symmetrically, as in FIG. 5, for example, but asymmetrically as well. Once again, the Hall element, not visible in FIG. 10a, is disposed in the slot 58 between the two segments 56, 57. In the view of FIG. 10a, the permanent magnet 59 disposed in the slot 60 embraces the segment 57; that is, the permanent magnet 59 and the segment 57 each have the same angular range of approximately 180°. In this arrangement, a magnetic flux as shown in FIG. 10c is obtained. It can be seen from FIG. 10c that because of the direction of polarization, that is, the radial orientation of the poles of the permanent magnet 59, the magnetic flux takes a course from the permanent magnet 59 across the air gap 60 into the segment 57 and across the air gap 58 and the Hall element disposed there into the segment 55. From the segment 55, the magnetic field lines extend across the bridge 56 and are distributed within the housing part 11d. In the housing part lid, the field lines flow both clockwise and counterclockwise back across the gap 60 into the permanent magnet 59. Because of the position shown in FIG. 10a, that is, the magnetic flux shown in FIG. 10c, the magnetic induction is maximal in the gap 58 or in other words in the Hall element. It can be seen from the view in FIG. 10c that virtually all the magnetic lines that leave the permanent magnet 59 cross the gap 58 between the segments 57 and 55 and thus affect the Hall element.

Figure 10D:
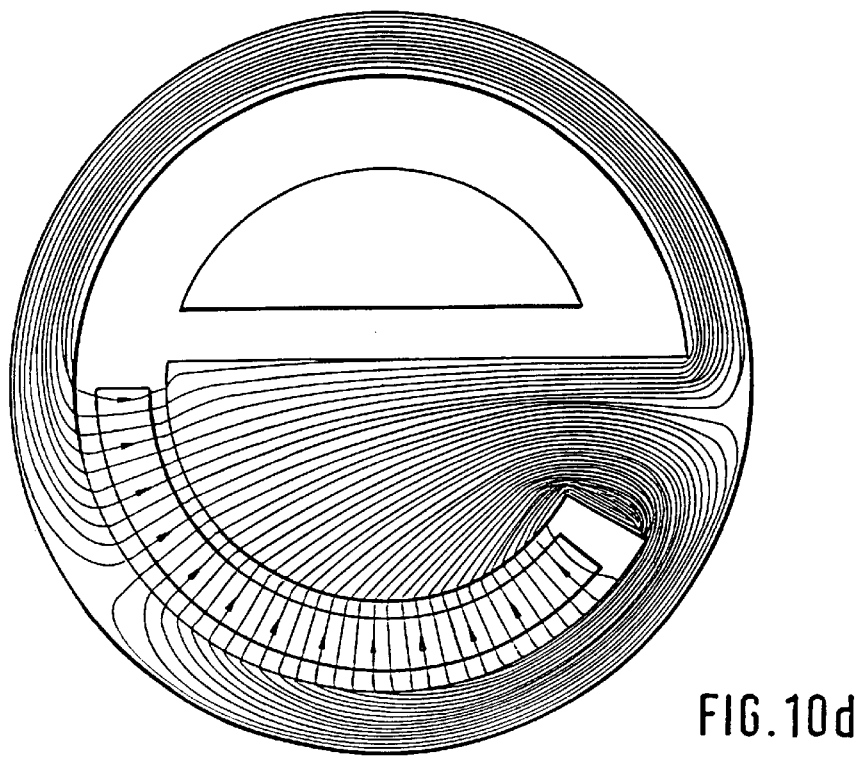

In FIG. 10b, the position of the rotor, that is, the permanent magnet 59, inside the stator upon minimal induction in the Hall element is shown. In FIG. 10b, the permanent magnet 59 has now rotated so far that it now embraces only the segment 55; it is understood that it does not contact the bridge 56. The associated magnetic flux for this position is shown in FIG. 10d. It can be seen that the magnetic flux from the permanent magnet 59 extends across the gap 60 into the segment 55, where it extends across the bridge 56 into the housing part 11d. The magnetic flux then splits again and extends clockwise and counterclockwise within the component 11d. In the region of the permanent magnet 59, it returns through the air gap 60 into the permanent magnet 59. It can be seen particularly from FIG. 10d that the magnetic flux does not flow through the gap 58, and thus no signal is generated in the Hall element.

Figure 11:
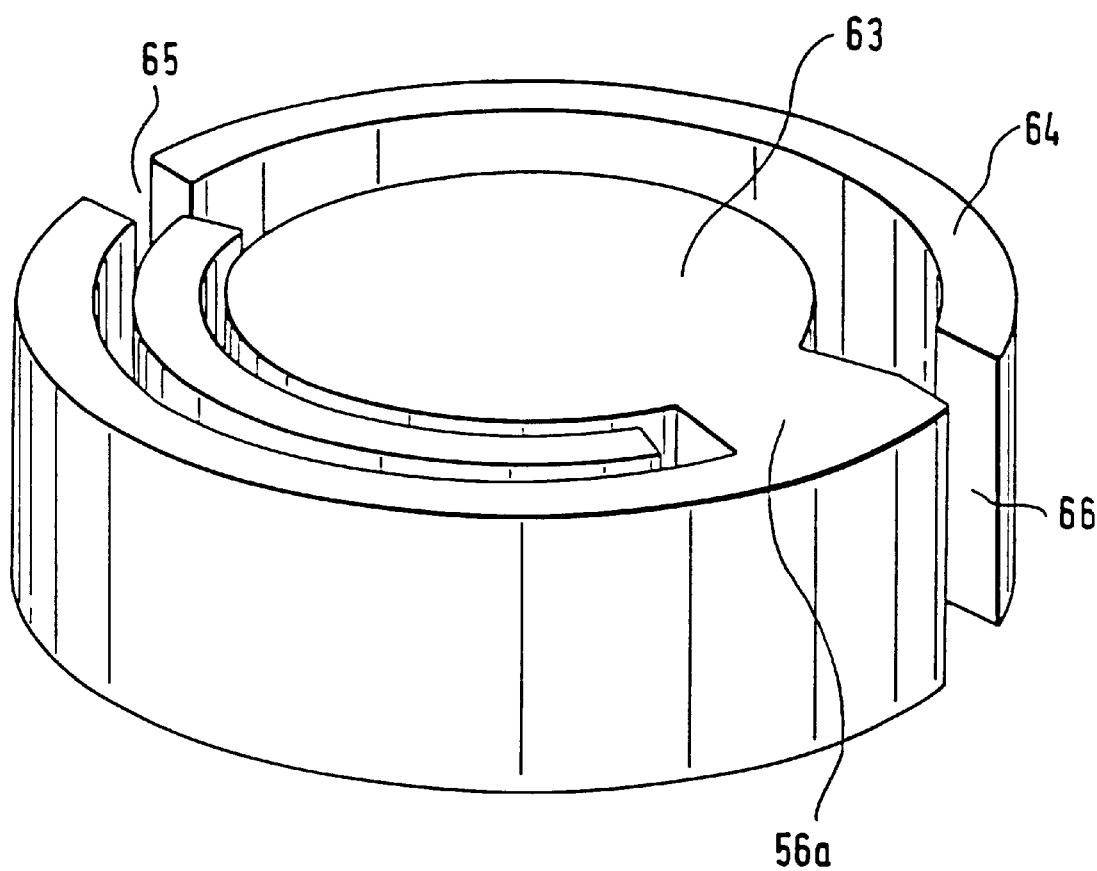
FIG. 11 is a modification of FIG. 10. From FIG. 11 on, an angle sensor is shown in a disklike embodiment.

It is also understood that as shown in FIG. 11 it is possible to use, instead of the two segments 55, 57, a solid body 68 that is joined to the housing part 64 with the aid of the bridge 56a. The housing part 64 again has two diametrically opposed slots 65, 66, in each of which a Hall element, not shown in FIG. 11, is disposed.

In all the exemplary embodiments, in FIGS. 1–11 described thus far, the permanent magnet may be produced not only from the known magnetic materials but also from plastic-bonded rare earth magnets such as $SM_2Co_{17}$.

Figure 12B:
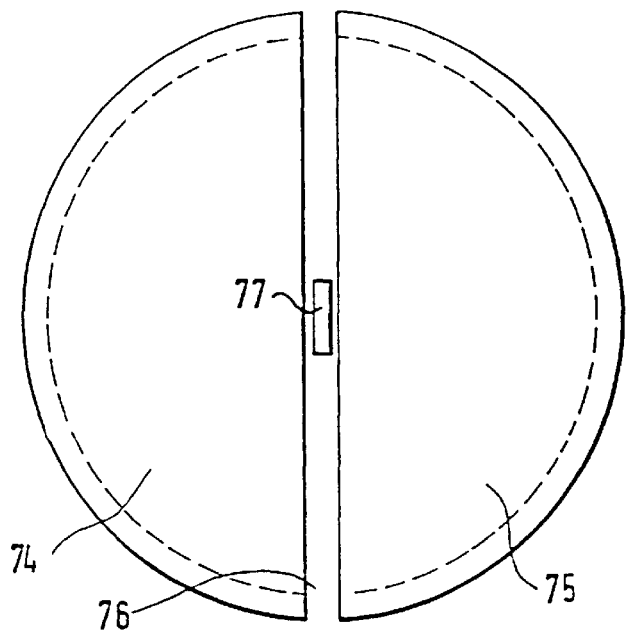
FIG. 12a shows a longitudinal section, FIG. 12b a bottom view, and FIG. 12c a top view on an exemplary embodiment.
Figure 12A:
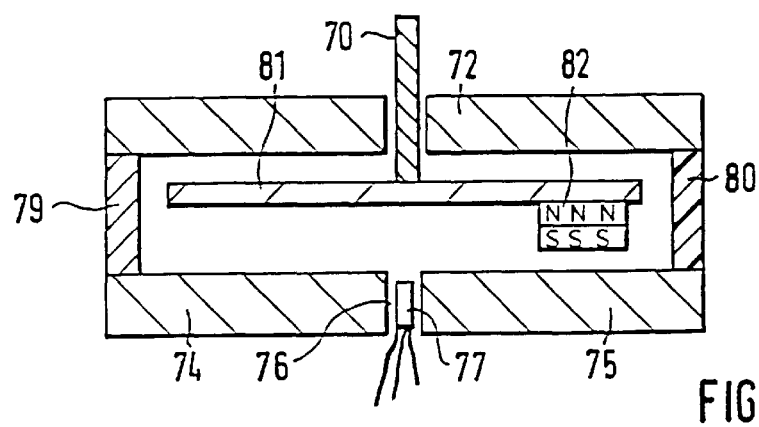
Figure 12C:
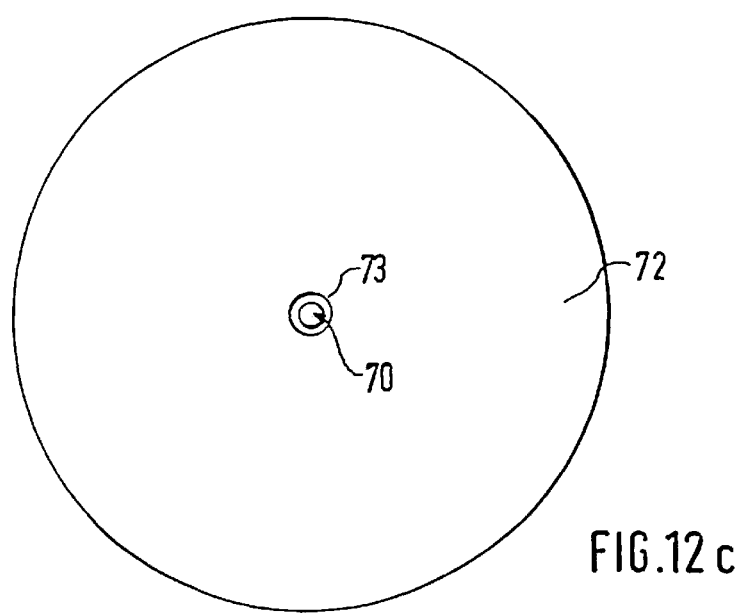
Figure 13:
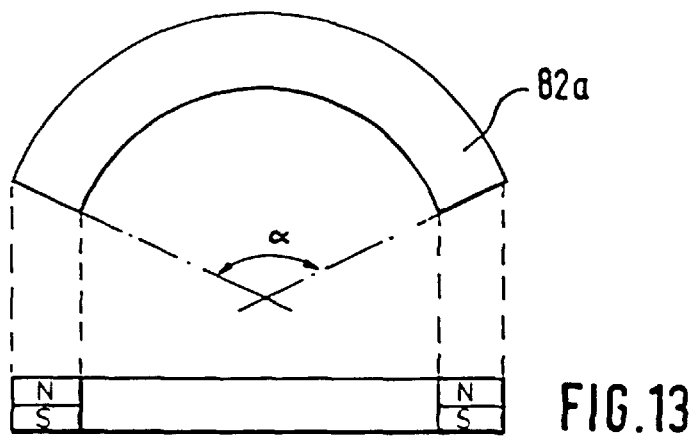
FIGS. 13 and 14 show modifications of a detail.
Figure 14:
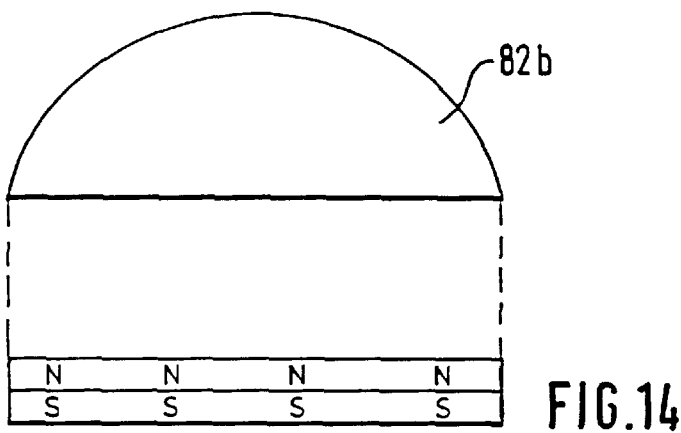
Figure 15:
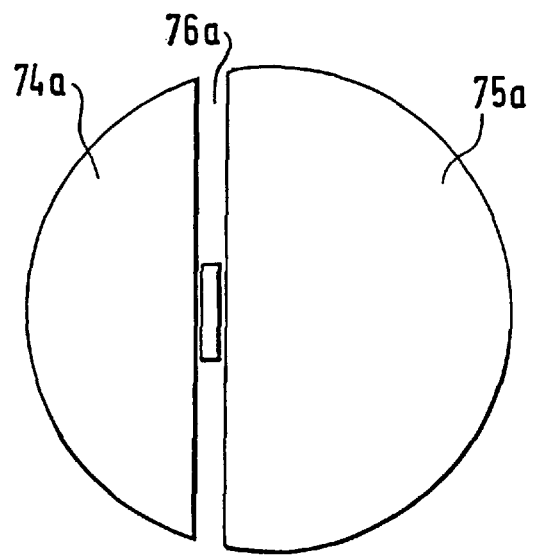
FIG. 15 an asymmetrical embodiment of the segments.

In the exemplary embodiments that now follow, an angle sensor is shown in which the stator and the rotor are disposed like disks side by side or one above the other. In FIG. 12a, the rotor has a shaft 70, with which it can be connected to a component, not shown in FIGS. 12a–c. As can be seen from FIG. 12c, the shaft 70 protrudes through a bore 73 formed in the cap plate 72. As seen in FIG. 12b, the bottom plate comprises a circular segment 74 and a circular segment 75, divided by a gap 76. A Hall element 77 is disposed centrally in the gap 76. The bottom plate 72 and the two segments 74, 75 are separated from one another with the aid of two spacers 79, 80. Secured to the end of the shaft 70 that protrudes through the bore 73 is a carrier plate 81, on which a permanent magnet 82 is located. The carrier plate 81 with the permanent magnet 82 acts as a rotor, while the cap plate 72 and the two segments 74, 75 and the two spacers 79, 80 serve as a stator. The cap plate 72 and the two segments 74, 75 and at least one of the spacers 79 comprise magnetically conductive material, in particular soft-magnetic material. The second spacer 80 is made of nonmagnetic material, such as plastic. It is not absolutely necessary, in this disklike embodiment of the angle sensor, for the outer contour to be circular. As in the exemplary embodiments described above, it is also possible here to dispose a plurality of magnet-field-sensitive elements in the gap 76 between the segments 74, 75, instead of one Hall element. The shape, that is, the angular range of the permanent magnet 82, is again dependent on the size of the angle to be measured. Thus in FIG. 13, a permanent magnet 82a for an angular range of approximately 140° is shown. In FIG. 14, on the other hand, the permanent magnet 82b is embodied as a semicircle and thus has a measurement angle of 180°. It can be seen from all three FIGS. 12a, 13 and 14 that the direction of polarization of the permanent magnet 82 is in the axial direction of the shaft 70. It is also possible here, as in the previous exemplary embodiments, for the segments 74 and 75 to be embodied either symmetrically, as shown in FIG. 12, or asymmetrically, as shown in FIG. 15. It can be seen in FIG. 15 that in the asymmetrical embodiment, the slot 76a extends outside the center point of the axis 70, and thus there are one smaller segment (74a), and one larger segment (75a). While in the version of FIG. 12a, because of the symmetrical embodiment of the segments 74, 75, it is arbitrarily possible for the spacer 80 made of nonmagnetic material to be selectively assigned to either one segment or the other, in the asymmetrical version of the angle sensor of FIG. 15 the larger segment 75a is connected to the cap part 72 with the aid of the soft-magnetic spacer 79. Because of the structural embodiment, it is also possible in disklike angle sensors to conduct the magnetic field lines of the magnet 82 employed in such a way as to raise the linear measurement range such that no change of sign takes place within the linear measurement range. The angular range within which a linearly extending measurement signal is generated can then also amount to $\geq 110°$.

Figure 16B:
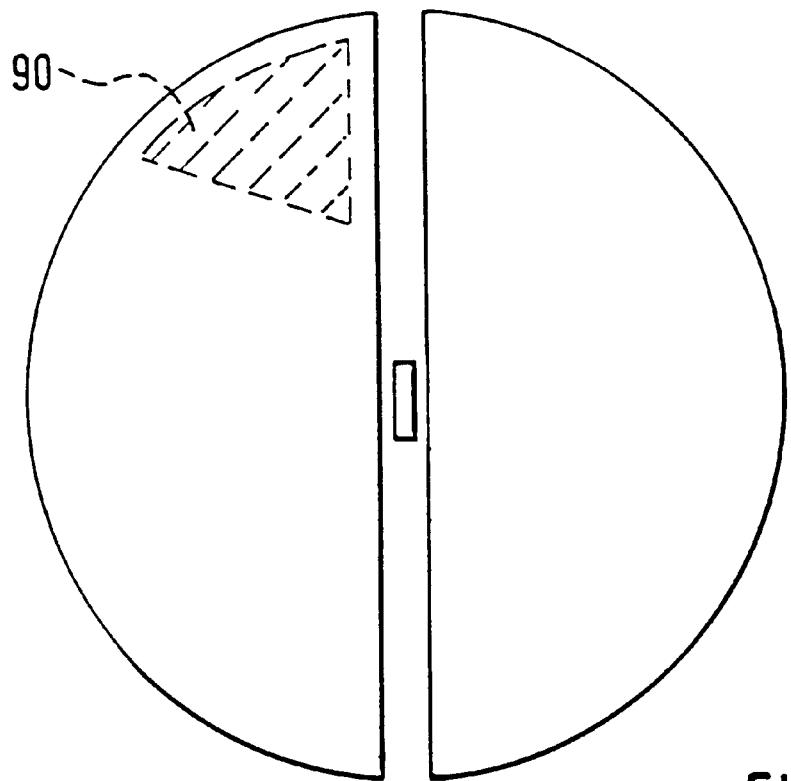
FIGS. 16a and 16b are modifications for an arbitrarily shaped guide piece in longitudinal section and in a bottom view, respectively.
Figure 16A:
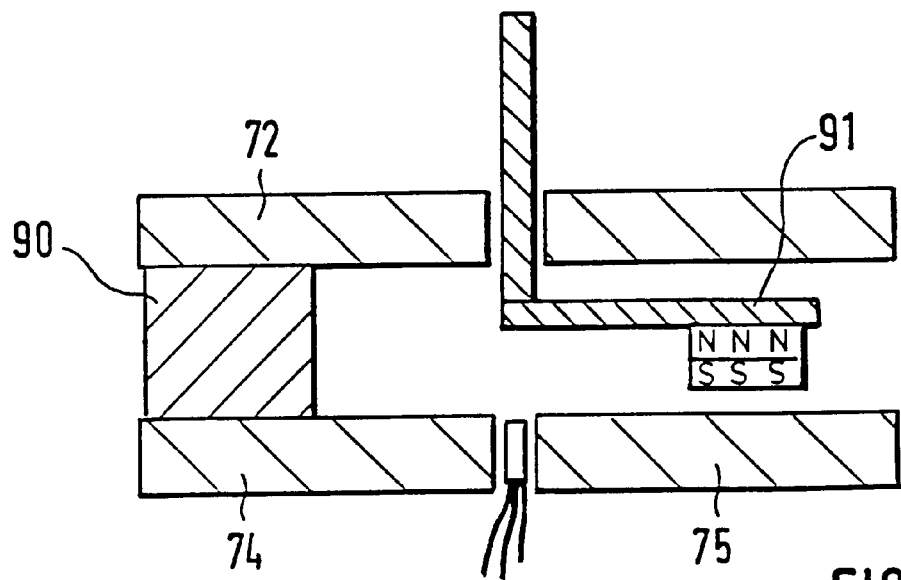

While in the exemplary embodiment of FIG. 12 a separation of the magnetic flux is effected with the aid of the spacer 80 comprising nonmagnetic material, and the flow of magnet lines is conducted through the magnetic spacer 79, a modification is shown in FIG. 16 in which these two spacers are not embodied as a ring. The guide piece 90 of magnetic material can be disposed between the cap 72 of magnetically conductive material and the segment 74. This guide piece 90, as a circular segment, for instance, may have an angle of approximately 90° in cross section. If the spacer is not embodied as a circle, then it protrudes between the cap plate 72 and the segments 74, 75. As a result, the rotational range in this modification of the angle sensor is limited to an angle of rotation smaller than 360°. The carrier plate 91 is then embodied as a semicircle, for instance.

Figure 17:
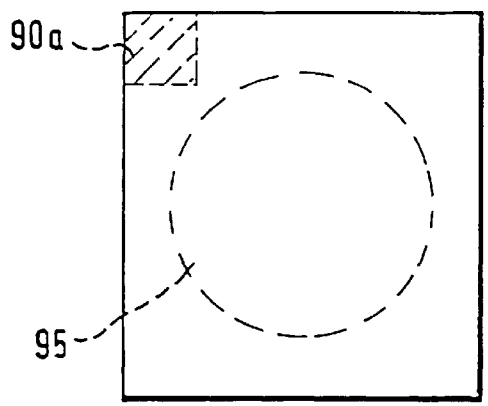
FIG. 17 is a further modification of FIGS. 13–16.

As already noted above, the cap plate and the two segments acting as a bottom need not be embodied circularly. In FIG. 17, a square embodiment of these parts of the angle sensor that act as a stator is shown. Here, the guide piece 90a may also be disposed outside the angular range 95 covered by the magnet. In this modification in FIG. 17, angles of rotation >360° are again possible.

Figure 18:
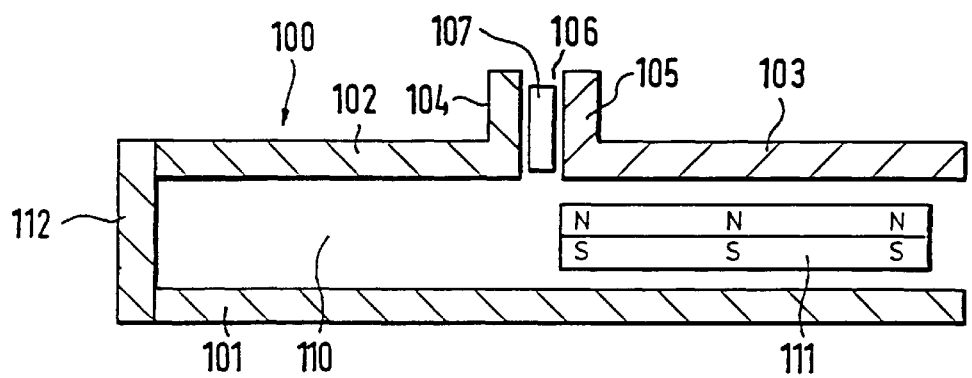
FIG. 18 shows a longitudinal section through a sensor for determining linear motions.
Figure 19:
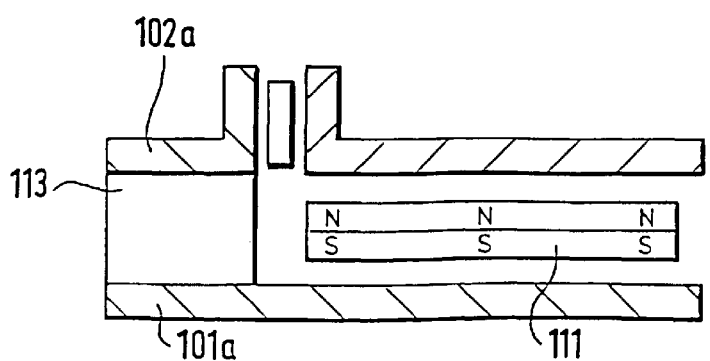
FIG. 19 shows a modification of the exemplary embodiment of FIG. 18.

The disklike embodiment of the sensor for determining angles of rotation can also be reconfigured to measure linear motions. To that end, the sensor 100 has a bottom plate 101. This bottom plate 101 is assigned a two-part cap plate opposite it, which comprises a first cap plate 102 and a second cap plate 103. Both cap plates 102, 103, on their opposed ends, have respective flangelike extensions 104 and 105. A Hall element or some other magnet-field-sensitive element 107 as noted above is disposed in a gap 106 between these extensions 104, 105. The extensions 104, 105 serve to distribute the magnetic flux uniformly in the region of the Hall element 107 and are necessary particularly for relatively large Hall elements 107. In smaller Hall elements they may be omitted. The two cap plates 102, 103 and the bottom plate 101 comprise magnetically conductive material, in particular soft iron. A disklike magnet 111, on which the measurement element, not shown, whose linear motion is to be determined is secured, is moved within the gap 110 between the bottom plate 101 and the two cap plates 102, 103. The polarization of the permanent magnet 111 is oriented such that it is aimed in the direction of the bottom plate 101 or opposite thereto. According to the invention, the cap plate 102 and the bottom plate 101 are now magnetically conductively joined to one another by a plate 112. By the thus-effected flow of the magnet lines, a shift in the linear range of the measurement curve generated is achieved, so that no change of sign occurs within the linear range of the measurement curve. In the version of FIG. 18, the linear measurement range is limited by the plate 112. If conversely, as shown in FIG. 19, the plate 113 that conducts the magnetic flux is disposed parallel to the direction of motion of the permanent magnet 111, then the permanent magnet 111 can be shifted outward via the outer opening of the sensor 100, or the cap plate 102a or the bottom plate 101a or both can be shortened. It is also possible to dispose only one plate 113 on one side, or to dispose a second plate 113 diametrically opposite it as well.

What is claimed is:

1. A measuring device for contactless determination of a rotation angle of a rotor (22) relative to a multi-part stator (10; 11,13,14) made from a magnetically conductive material, said measuring device comprising at least one magnet-field-sensitive element (20) and at least one segment of at least one ring magnet arranged in said rotor (22);

wherein a first air gap (21) is located between the stator (10; 11, 13, 14) and the rotor (22) and at least one second air gap (12) is formed in the stator (10; 11, 13, 14); said at least one magnet-field-sensitive element (20) is located in the at least one second air gap (12); said stator (10; 11,13,14) comprises a plurality of parts (11, 13, 14); at least one (11,14) of said parts of the stator (10) has a magnetically conductive connection with remaining ones of said parts, and at least one other (13) of said parts has no magnetically conductive connection (18) with remaining ones (11,14) of said parts, so that the ring magnet (22) has a magnetic flux split up so as to produce at least one first partial flux (F1), and so that said at least one first partial flux (F1) flows through the at least one magnet-field-sensitive element (20).

2. A measuring device for contactless measurement of a linear motion comprising a stator (100), a moveable part (111) including a magnet, said moveable part being responsive to said linear motion so as to move relative to said stator (100), and a magnet-field-sensitive element (107) located in the stator (100), wherein at least one air gap (110) is located between the stator (100) and the moveable part (111), at least one other air gap (106) is provided in the stator (100) and the magnet-field-sensitive element (107) is located in the at least one other air gap (106), and wherein said magnet is polarized perpendicular to a motion direction of said linear motion; the stator (100) is at least partly made of magnetically conductive material and comprises a plurality of parts (112, 101, 102, 103), wherein at least one (101,102) of the parts of the stator (100) has a magnetically conductive connection with remaining ones of the parts and at least one other (103) of the parts has no magnetically conductive connection with the remaining ones of the parts (102, 112, 101), so that said magnet has a magnetic flux is split up into at least one first partial flux (F1) flowing through the at least one magnet-field-sensitive element (107).

3. A measuring device for contactless determination of a rotation angle of a rotor (22) relative to a multi-part stator (10; 11, 13, 14) made from a magnetically conductive material, said measuring device comprising at least one magnet-field-sensitive element (20) and at least one segment of at least one ring magnet arranged in said rotor (22);

wherein a first air gap (21) is located between the stator (10; 11, 13, 14) and the rotor (22) and at least one second air gap (12) is formed in the stator (10; 11, 13, 14); said at least one magnet-field-sensitive element (20) is located in the at least one second air gap (12); said stator (10; 11, 13, 14) comprises a plurality of parts (11, 13, 14); at least one (11, 14) of said parts of the stator (10) has a magnetically conductive connection with remaining ones of said parts, and at least one other (13) of said parts has no magnetically conductive connection (18) with remaining ones (11, 14) of said parts, so that the ring magnet (22) has a magnetic flux split up so as to produce at least one first partial flux (F1), and so that said at least one first partial flux (F1) flows through the at least one magnet-field-sensitive element (20), and wherein said stator comprises a housing part (11), a first stator segment (13) and a second stator segment (14), said stator segments being mounted in said housing part (11); said first stator segment (14) is connected in said magnetically conductive connection with said housing part (11), and said second stator segment (14) is connected in a magnetically insulated manner with said housing part (11).

4. The measuring device as defined in claim 3, wherein said first stator segment (14) has an extension plate (30) connecting said first stator segment with said housing part (11a).

5. The measuring device as defined in claim 3, wherein said first stator segment (14) is connected by means of an extension (56) to the housing part (11).

6. The measuring device as defined in claim 3, wherein said segments (13, 14) are symmetrically embodied.

7. The measuring device as defined in claim 3, wherein said segments (13, 14) are asymetrically embodied.

8. The measuring device as defined in claim 1, wherein said the stator comprises a core (45) and a multi-part housing (49, 50) surrounding said core (45) and said stator is provided with at least one slot (46, 47) for the at least one magnet-field-sensitive element (39a, 40a); and said core (45) has a magnetically conductive connection (46) with a portion of the multi-part housing.

9. The measuring device as defined in claim 8, wherein the rotor (22) and the stator (10) are both disklike.

* * * * *